(12) United States Patent
Ramadas

(10) Patent No.: US 6,477,291 B1
(45) Date of Patent: Nov. 5, 2002

(54) METHOD AND SYSTEM FOR IN-BAND CONNECTIVITY FOR OPTICAL SWITCHING APPLICATIONS

(75) Inventor: Krishna Kumar Ramadas, Cupertino, CA (US)

(73) Assignee: Nayna Networks, Inc., Milpitas, CA (US)

( * ) Notice: Subject to any disclaimer, the term of this patent is extended or adjusted under 35 U.S.C. 154(b) by 0 days.

(21) Appl. No.: 09/952,742

(22) Filed: Sep. 13, 2001

(51) Int. Cl.[7] ................................................. G02B 6/26
(52) U.S. Cl. ......................................... 385/17; 359/115
(58) Field of Search ............................. 385/16, 17, 18, 385/24, 14, 15, 20, 46; 324/97; 359/115, 124, 127, 128

(56) References Cited

U.S. PATENT DOCUMENTS

| | | |
|---|---|---|
| 4,942,766 A | 7/1990 | Greenwood et al. |
| 5,488,862 A | 2/1996 | Neukermans et al. |
| 5,629,790 A | 5/1997 | Neukermans et al. |
| 5,648,618 A | 7/1997 | Neukermans et al. |
| 5,658,710 A | 8/1997 | Neukermans |
| 5,841,553 A | 11/1998 | Neukermans et al. |
| 5,861,549 A | 1/1999 | Neukermans et al. |
| 5,969,465 A | 10/1999 | Neukermans et al. |
| 6,064,779 A | 5/2000 | Neukermans et al. |
| 6,192,172 B1 * | 2/2001 | Fatehi et al. ................. 359/124 |
| 6,201,909 B1 * | 3/2001 | Kewitsch et al. ........... 359/124 |
| 6,335,992 B1 * | 1/2002 | Bala et al. ................... 359/115 |
| 6,363,183 B1 * | 3/2002 | Koh ............................. 385/14 |
| 6,411,751 B1 * | 6/2002 | Giles et al. ................... 324/97 |

FOREIGN PATENT DOCUMENTS

| | | |
|---|---|---|
| WO | PCT/US99/20218 | 3/2000 |
| WO | PCT/US99/21139 | 4/2000 |

* cited by examiner

Primary Examiner—Akm E. Ullah
(74) Attorney, Agent, or Firm—Townsend & Townsend & Crew LLP

(57) ABSTRACT

A method (and system) for communicating between at least two optical switching systems. Each of the optical switching systems includes an optical cross-connect coupled to an incoming fiber bundle and coupled to an outgoing fiber bundle. The method determines a control channel from a plurality of available channels. The plurality of available channels is provided on one or more optical fibers. The plurality of optical fibers are coupled between a first optical switch system and a second optical switch system. The method also opens an internal communication loop for the control channel between a first multiplexing device coupled to the first optical switch system and a second multiplexing device coupled to the second optical switch system. The method also includes forming a connection between the first optical switch system and the second optical switch system during a period of time that the internal communication loop has been opened. A step of maintaining the connection and transferring internal information between the first optical switch system and the second optical switch system also is included.

16 Claims, 16 Drawing Sheets

METHOD AND SYSTEM FOR IN-BAND CONNECTIVITY FOR OPTICAL SWITCHING APPLICATIONS

BACKGROUND OF THE INVENTION

This present invention generally relates to techniques for optical switching. More particularly, the present invention provides a method and system for communicating between more than one optical switching systems, which are on a communication network. Merely by way of example, the invention is applied to a MEMS based switching system over a wide area network for long haul communications. But it would be recognized that the invention could also be applied to other types of switching such as wave guides, electro-optic devices, holographic switches, bubble switches, liquid crystal switches, and many others for applications including metropolitan, access, and other networks.

Over the past years, digital telephone has progressed with a desire for faster communication networks. In general, conventional analog voice telephone signals have been converted into digital signals. These signals can have transmission rates of 64,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode fiber optics has also been used at much higher speeds of data transfer. Here, optical switching networks have also been improved. An example of such optical switching standard is called the Synchronous Optical Network (SONET), which is a switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices often require the need to convert optical signals from a first source into electric signals for switching such optical signals over a communication network. Once the electric signals have been switched, they are converted back into optical signals for transmission over the network. As merely an example, a product called the SN 16000, BroadLeaf™ Network Operating System (NOS), made by Sycamore Networks, Inc. uses such electrical switching technique. Other systems have been developed by Lucent Technologies, Inc., Ciena Corporation, and other companies. Numerous limitations exist with such conventional electrical switching technique. For example, such electrical switching often requires a lot of complex electronic devices, which make the device difficult to scale. Additionally, such electronic devices become prone to failure, thereby influencing reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale and to build commercial devices.

Other companies have also been attempting to develop technologies for switching a high number of signals in other ways such as high density mirror arrays, but have been generally unsuccessful. A major obstacle for such high density mirror arrays is limited control software and complex system architecture. Conventional control software and the like have been developed for optical-to-electrical-to-optical switches. Such conventional software has been effective for controlling electrical communication signals. Additionally, such conventional software has not been implemented to communicate between more than one switching systems. Although effective for such electrical signals, they have limited applicability for optical communication signals and problems related thereto. Accordingly, such attempts have generally been unsuccessful.

From the above, it is seen that an improved way to communicate between optical switching systems is highly desirable.

SUMMARY OF THE INVENTION

According to the present invention, techniques including methods and systems for optical switching are provided. More particularly, the present invention provides a method and system for communicating between optical switching systems. Merely by way of example, the invention is applied to a MEMS based switching system over a wide area network for long haul communications. But it would be recognized that the invention could also be applied to other types of switching such as wave-guides, electro-optic devices, holographic switches, bubble switches, liquid crystal switches, and many others for applications including metropolitan, access, and other networks.

In a specific embodiment, the invention provides an optical system for switching one of a plurality of optical signals through a MEMS based cross-connect device. The system has first fiber input/output device and second fiber input/output device. An optical cross-connect device is coupled between the first fiber input/output device and the second fiber input/output device. A communication control device is adapted to identify a wavelength from either one of the first input/output device or the second fiber input/output device and selecting one of the first input/output devices for transmitting internal information to a second optical switch system.

In an alternative embodiment, the invention provides a method for communicating between at least two optical switching systems. Each of the optical switching systems includes an optical cross-connect coupled to an incoming fiber bundle and coupled to an outgoing fiber bundle. The method determines a control channel from a plurality of available channels. The plurality of available channels is provided on one or more optical fibers. The plurality of optical fibers are coupled between a first optical switch system and a second optical switch system. The method also opens an internal communication loop for the control channel between a first multiplexing device coupled to the first optical switch system and a second multiplexing device coupled to the second optical switch system. The method also includes forming a connection between the first optical switch system and the second optical switch system during a period of time that the internal communication loop has been opened. A step of maintaining the connection and transferring internal information between the first optical switch system and the second optical switch system also is included.

Many benefits are achieved by way of the present invention over conventional techniques. In some embodiments, the invention provides a way of communicating between two optical switching systems. Additionally, the invention provides a non-intrusive technique for communicating between such systems. In other aspects, the invention can be implemented using conventional hardware and/or software technologies. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, techniques including methods and systems for optical switching are provided. More particularly, the present invention provides a communication technique for exchanging information between two or more optical switching systems. Merely by way of example, the invention is applied to a MEMS based switching system over a wide area network for long haul communications. But it would be recognized that the invention could also be applied to other types of switching such as wave guides, electro-optic devices, holographic switches, bubble switches, liquid crystal switches, and many others, for applications including metropolitan, access, and other networks.

Figure 1:
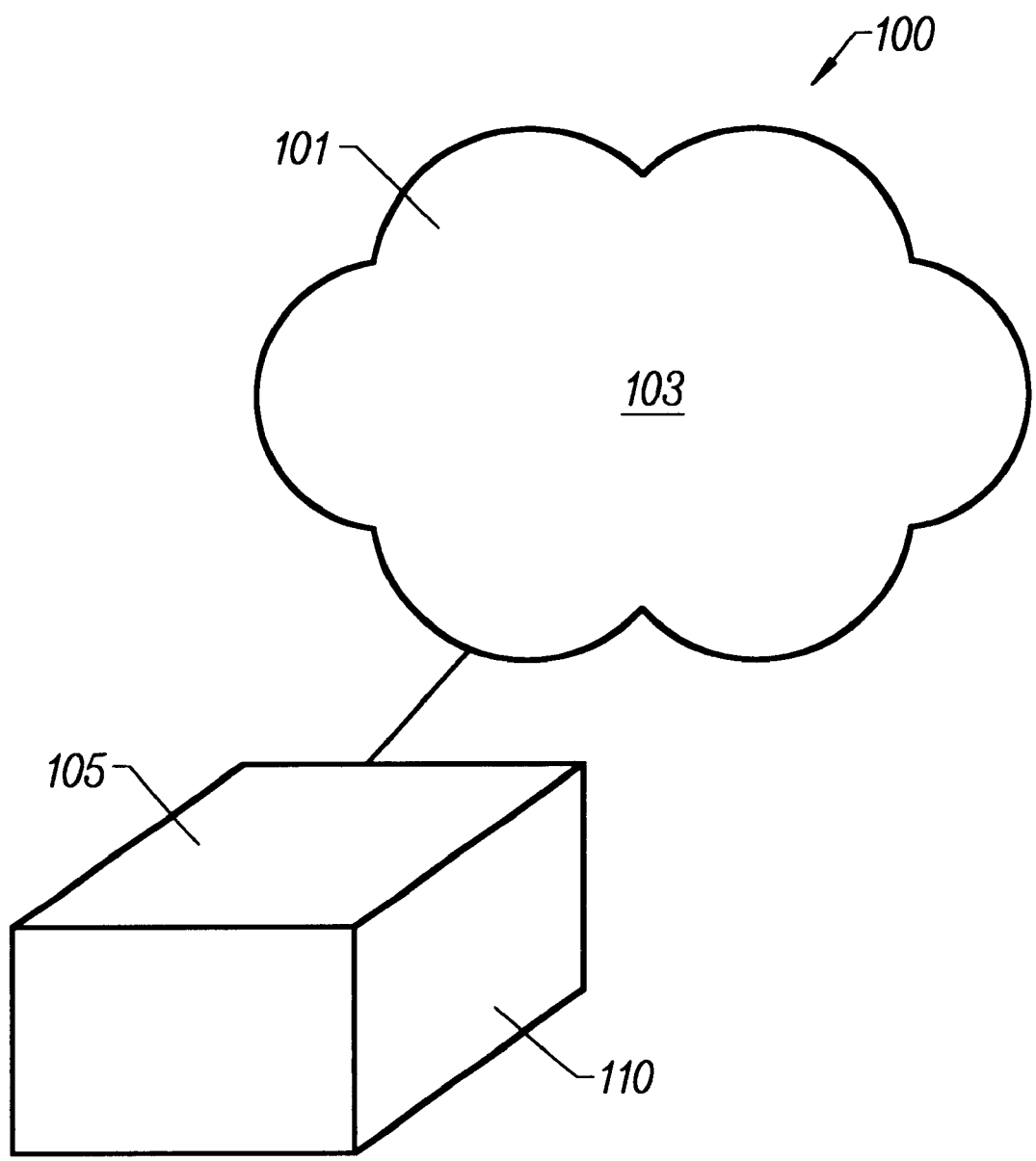
FIG. 1 is simplified diagram of an optical switching network according to an embodiment of the present invention.

FIG. 1 is simplified diagram 100 of an optical switching network according to an embodiment of the present invention. This diagram is merely an example, which should not unduly limit the scope of the claims herein. One of ordinary skill in the art would recognize many other variations, modifications, and alternatives. As shown, the diagram illustrates an optical network system 100 including a plurality of SONET rings or the like, which are shown by a cloud 101 configuration. Each of the SONET rings is coupled to one or more network switching systems 103, 105, which are coupled to each other. The network switching systems can be coupled to long haul optical network system. In a specific embodiment, each of the systems switches an optical signal from one of the rings to another one of the rings, where the transmission path is a substantially optical path. That is, the signal is not converted into an electrical signal via an optoelectronic device, which is coupled to an electrical switch that switches the signal. In the present embodiment, the transmission path is substantially optical. Further details of the switching system are provided below.

Figure 1A:
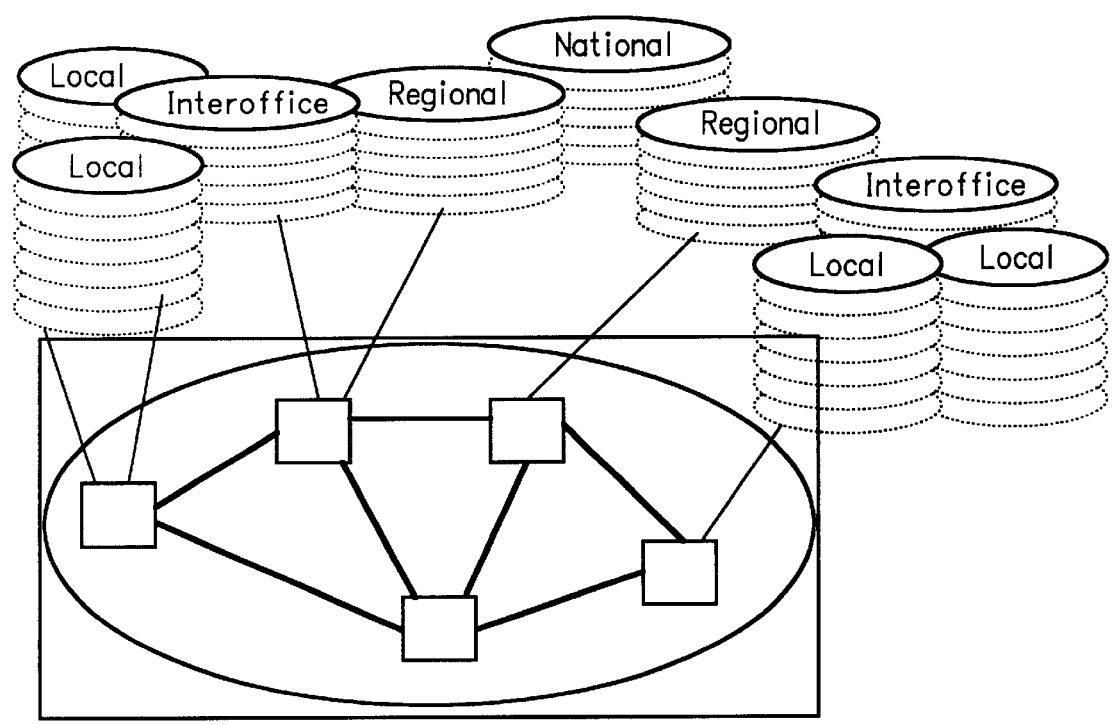
FIGS. 1A, 1B, and 1C are simplified diagrams of the present system in alternative deployment embodiments.

In a specific embodiment, the invention provides a system for bypassing traffic from the SONET networks, which can be congested, onto optical networks, as shown in FIG. 1A. The traffic from the congested SONET rings from regional, national, local, interoffice, and others will be tapped off and transported across the country to the destination. The switches can be deployed at major hubs to add, drop, and transport traffic through the network. Shown below are typical examples of how the present switches may be configured to relieve the SONET traffic.

Figure 1B:
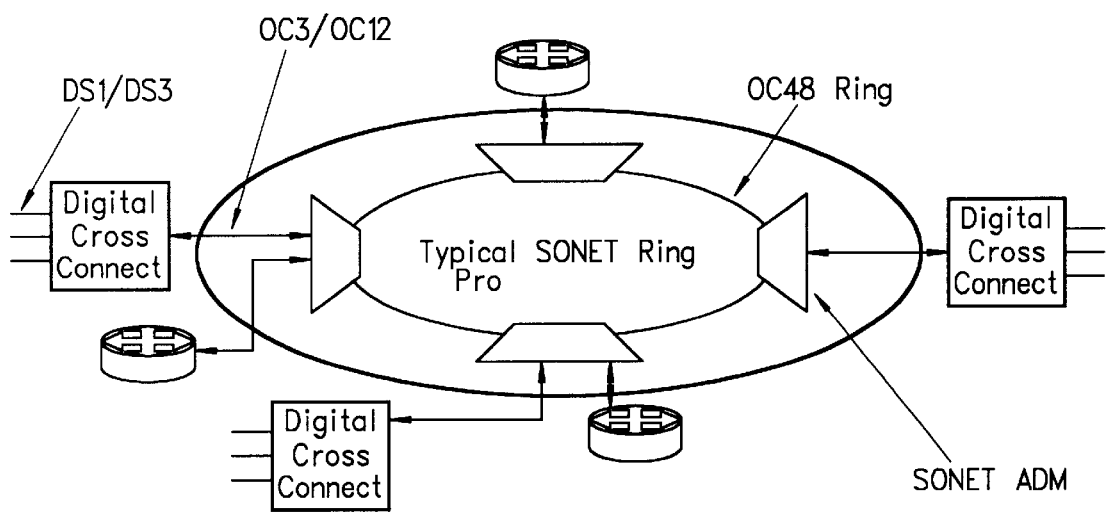
Figure 1C:
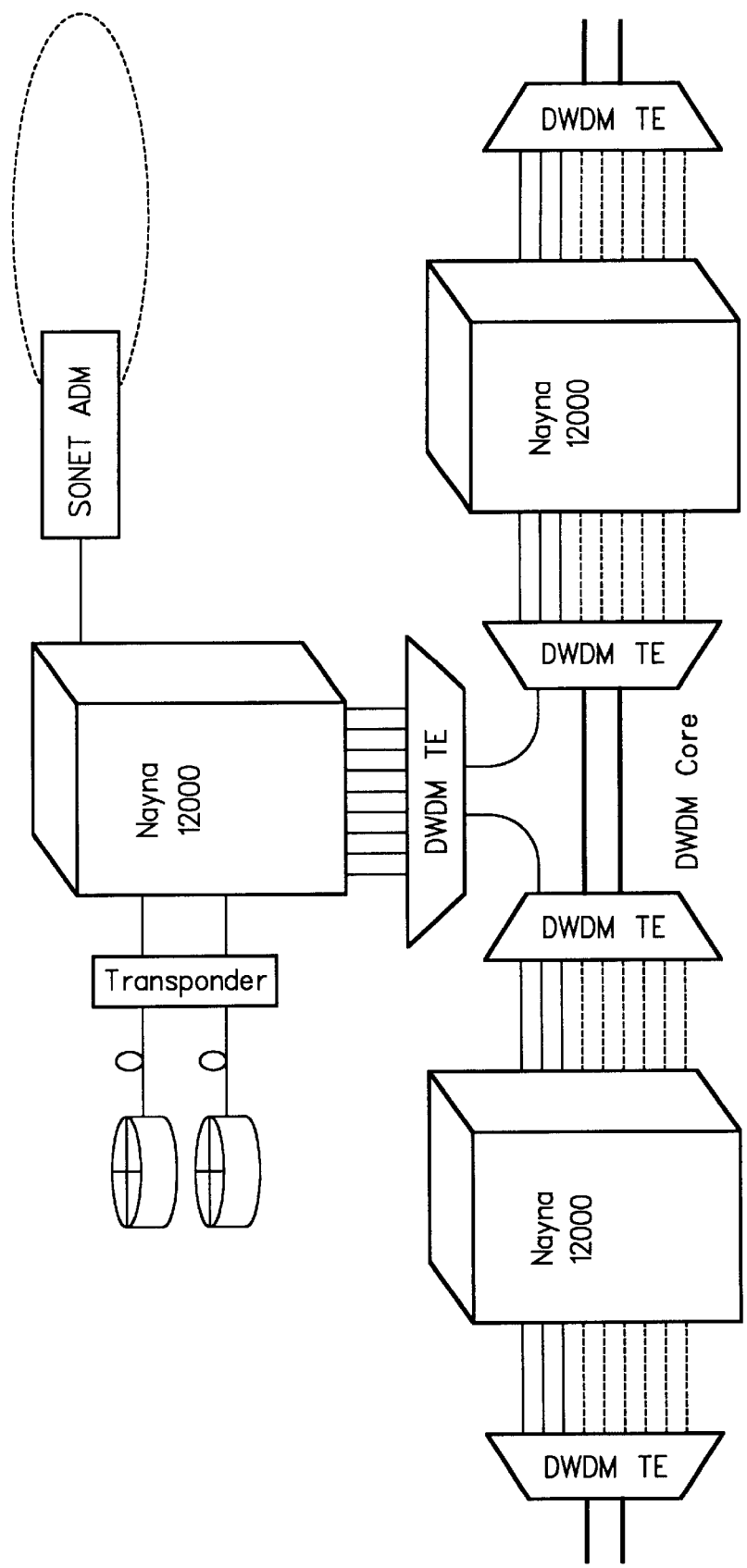

At least two reference models have been provided for the deployment of optical switches. In a preferred embodiment, the present system supports each of the models based on customer needs. FIG. 1B shows a simplified physical implementation of the SONET node and how the present switch system connects to it. (Not shown are the DWDM transport termination boxes, which feed the de-multiplexed signals to the present systems). Alternatively, the present system can be coupled to nodes with DWDM terminating equipment. The system supports connection from remote and collocated routers through DWDM interfaces. For local router control it is often desirable to use a transponder to map wavelengths to a telephone grid, e.g., ITU grid.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. The present system can also be deployed in other configurations, as well. It is also understood that the examples and embodiments described herein are for illustrative purposes only and that various modifications or changes in light thereof will be suggested to persons skilled in the art and are to be included within the spirit and purview of this application and scope of the appended claims.

Figure 2:
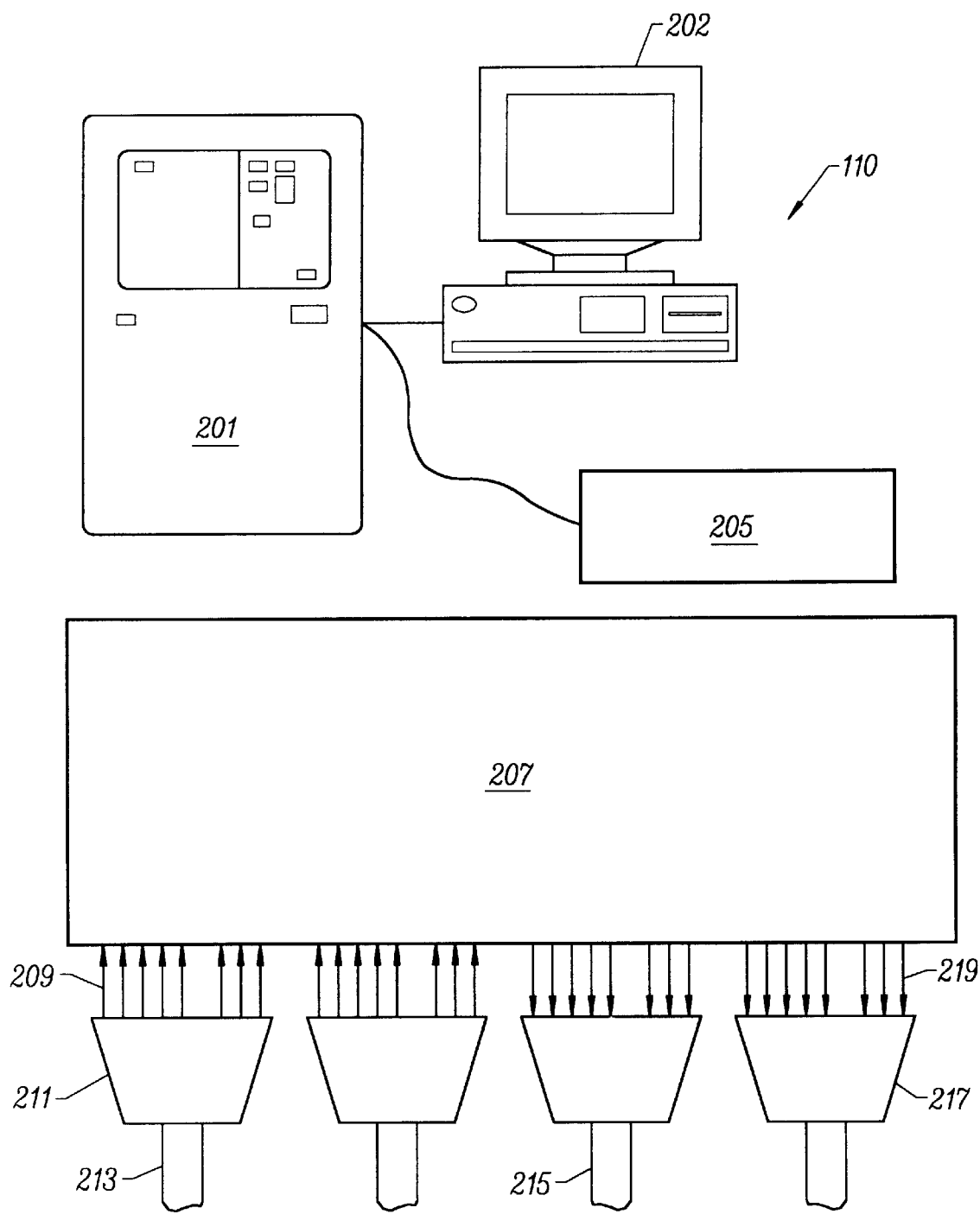
FIG. 2 is a detailed diagram of an optical switching system according to an embodiment of the present invention.

FIG. 2 is a detailed diagram of an optical switching system 200 according to an embodiment of the present invention. This diagram is merely an example, which should not unduly limit the scope of the claims herein. One of ordinary skill in the art would recognize many other variations, modifications, and alternatives. As shown, the switching system 110 includes a variety of features such as a switching apparatus 207. Apparatus 207 couples to incoming fiber bundles 213 through multiplexer/demultiplexer devices 211. In a preferred embodiment, the multiplexer/demultiplexer devices are DWDM devices, which receive signals from incoming fiber bundle 213 and separate such signals into channels 209, each representing a wavelength or the like. Apparatus 207 also couples to outgoing fiber bundles 215 through multiplexer/demultiplexer devices 217. In a preferred embodiment, the multiplexer/demultiplexer devices are DWDM devices, which receive channels representing wavelengths 219 from the apparatus and output such channels as outgoing optical signals.

A communication control device 205 couples to the apparatus. Such control device is overseen by a computing device 201, which includes a display. The computing device can be any suitable microprocessor based device. The computing device couples to display 202. Depending upon the embodiment, a variety of software processes can be incorporated into the computing device, which have been described throughout the present specification and more particularly below. Additionally, further details of the apparatus are also provided throughout the present specification and more particularly below.

Figure 3:
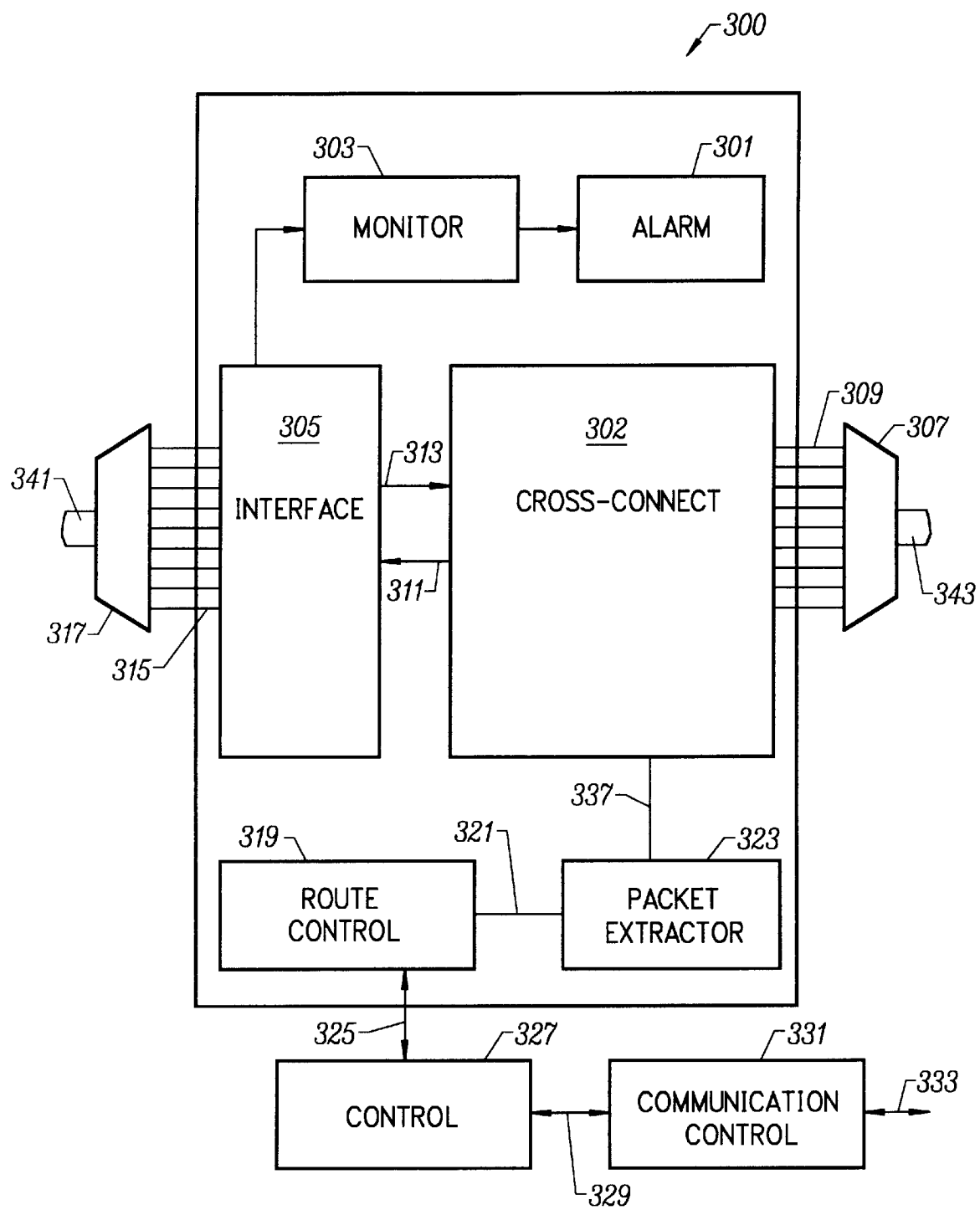
FIG. 3 is a more detailed diagram of an optical switching system according to an embodiment of the present invention.

FIG. 3 is a more detailed diagram of an optical switching system 300 according to an embodiment of the present invention. This diagram is merely an example, which should not unduly limit the scope of the claims herein. One of ordinary skill in the art would recognize many other variations, modifications, and alternatives. As shown, the system has a variety of elements including fiber interfaces, 305, which couple to cross-connect 302. Fiber interfaces 305 couple to multiplexers/demultiplexers, DWDM devices, 317, 307. Device 317 has input fiber bundle 341 and output fibers 315, which are numbered from 1 to n, representing integers for example. Device 307 has output fiber bundle 343 and output fibers 309, which are numbered from 1 to n. The data path through the interface devices and cross-connect correspond to light paths through the fiber interfaces, and the switching matrices. In a specific embodiment, the paths are switched at configuration through user control or dynamically through multi-protocol latched switching (MPLS) signaling messages. In preferred embodiments, generally all data paths through the system have redundant configurations to support high system availability and avoid single points of failure. Other elements include a performance monitoring module 303 coupled to the interface and an alarm 301 coupled to the module. Additionally, the system includes a packet extractor 323 coupled to the cross-connect 302 via line 337. A route control 319 is coupled to the packet extractor via line 321. Overseeing and controlling the system is control 327 coupled via line 325. Communication control 331 is coupled to control via line 329. The communication control 331 couples to network management modules via network interface 333. Further details of networking and other interface devices are provided below.

Figure 4:
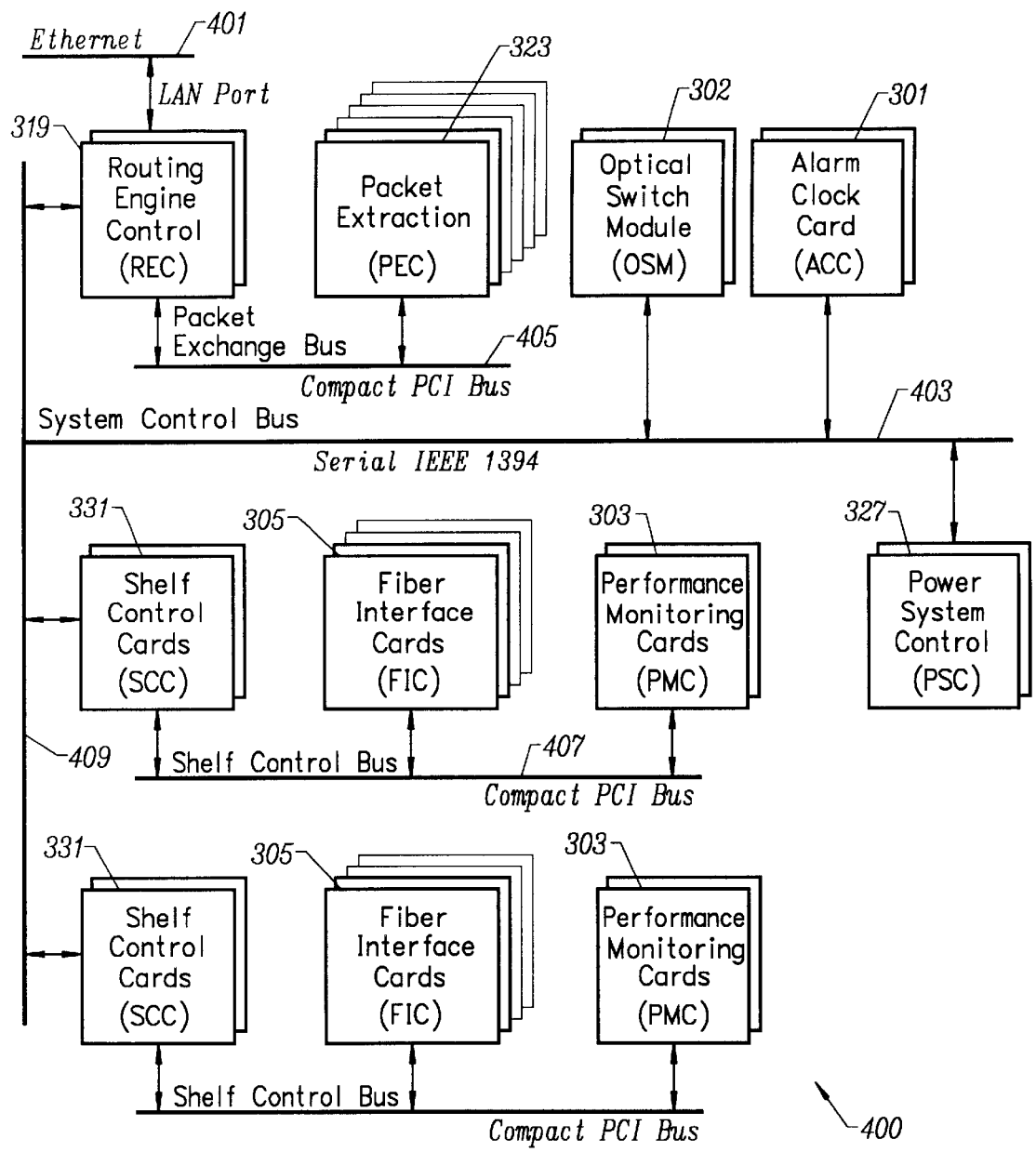
FIG. 4 is a more detailed block diagram of an optical switching system according to an alternative embodiment of the present invention.

FIG. 4 is a more detailed block diagram 400 of an optical switching system according to an alternative embodiment of the present invention. This diagram is merely an example, which should not unduly limit the scope of the claims herein. One of ordinary skill in the art would recognize many other variations, modifications, and alternatives. Like reference numerals are used in this FIG. as the previous FIG. for cross-referencing purposes only. As shown, the system includes interface devices, such as a local area network 401, which couples to the routing engine control 319. The system also includes a common system control bus 403, which couples to optical switch module 302 and alarm clock card 301. The control bus also couples to power system control 327. The system control bus also couples to shelf control card, which couples to fiber interface card 305 and couples to performance monitoring card 303 through shelf control bus 407. The system control bus 409 couples to shelf control card, which also couples to fiber interface card 305 and performance monitoring card 303 through shelf control bus.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. Further details of each of the elements in this diagram are provided throughout the specification and more particularly below.

FIGS. 4A through 4H are more detailed diagrams of elements in the system according to embodiments of the present invention. These diagrams are merely examples which should not unduly limit the scope of the claims herein. Each of the elements can be implemented using a combination of hardware and/or software. Such elements include: Routing Engine Card; Shelf Control Cards; Fiber Interface Cards; Switch Fabric; Packet Extraction Cards; Performance Monitoring card; Backplane; Alarm Clock Card; and Power Supply System. All of the above elements are preferably field replaceable. Additionally, the term "card" is not intended to describe any physical device but is merely used for illustrative purposes. A brief description of the elements is presented below.

Routing Engine Card

Figure 4A:
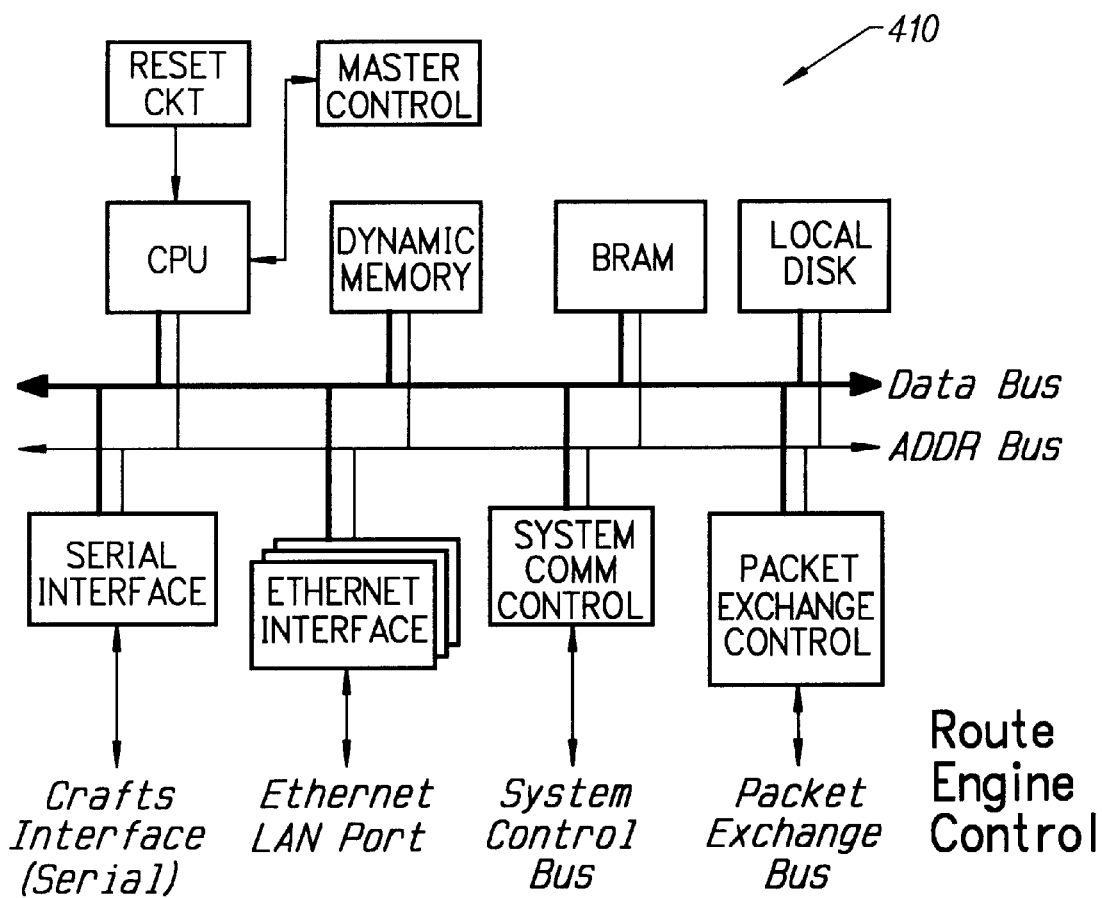
FIGS. 4A through 4H are more detailed diagrams of elements in the system according to embodiments of the present invention.

Referring to FIG. 4A, the system includes a Routing Engine Control (REC) card, which is the main system controller in a specific embodiment. The REC card manages configuration of the system, interfaces and oversees most if not all element management systems, processes IP control messages, and administers control and data buses in the system. REC cards are installed in a 1+1 redundant configuration with mastership logic used to determine the active and standby states of the switches. Functions of the REC are to provide the control interface, manage the system resources, and process IP control messages to and from a Packet Extraction Card (PEC), which will be described in more detail below.

In a specific embodiment, the REC includes a control processor 402, control bus communication 413, packet interchange bus 412, mastership control 404, and memory systems 405, 406. The control processor can be any suitable micro processing device such as an Intel Pentium based controller manufactured by Intel Corporation of Santa Clara, Calif., which includes boot logic and reset logic 403, a clock oscillator, LED indicators, and other features. As shown, the REC card includes a system control bus interface 410, which can be a high-speed serial 1394 bus or any other suitable device. The control bus interfaces to the shelf controllers, the optical switch matrix, alarm control, and the power system control for configuration, monitoring, and administration functions.

As shown, the REC has a serial port 408 to support a Crafts interface. The serial port can be any suitable port such as an RS232 port that is auto-sensing for port speed. The REC also has a plurality of local area networking (i.e., Ethernet) ports 409 to support LAN access. Such LAN ports interface to network management and additional future network elements. A packet interchange bus 411 communicates between the PEC and the REC. The package interchange bus is based on the compact PCI bus architecture. The PCI common bus will be for configuration and management in addition to supporting configuration and management. The REC card includes support storage of selected system and network configuration to hard-disk media, which is a local disk system 407 located on the REC. In a specific embodiment, the present system allows the REC to process up to 25,000 messages per second and greater.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like.

Shelf Control Card

Figure 4B:
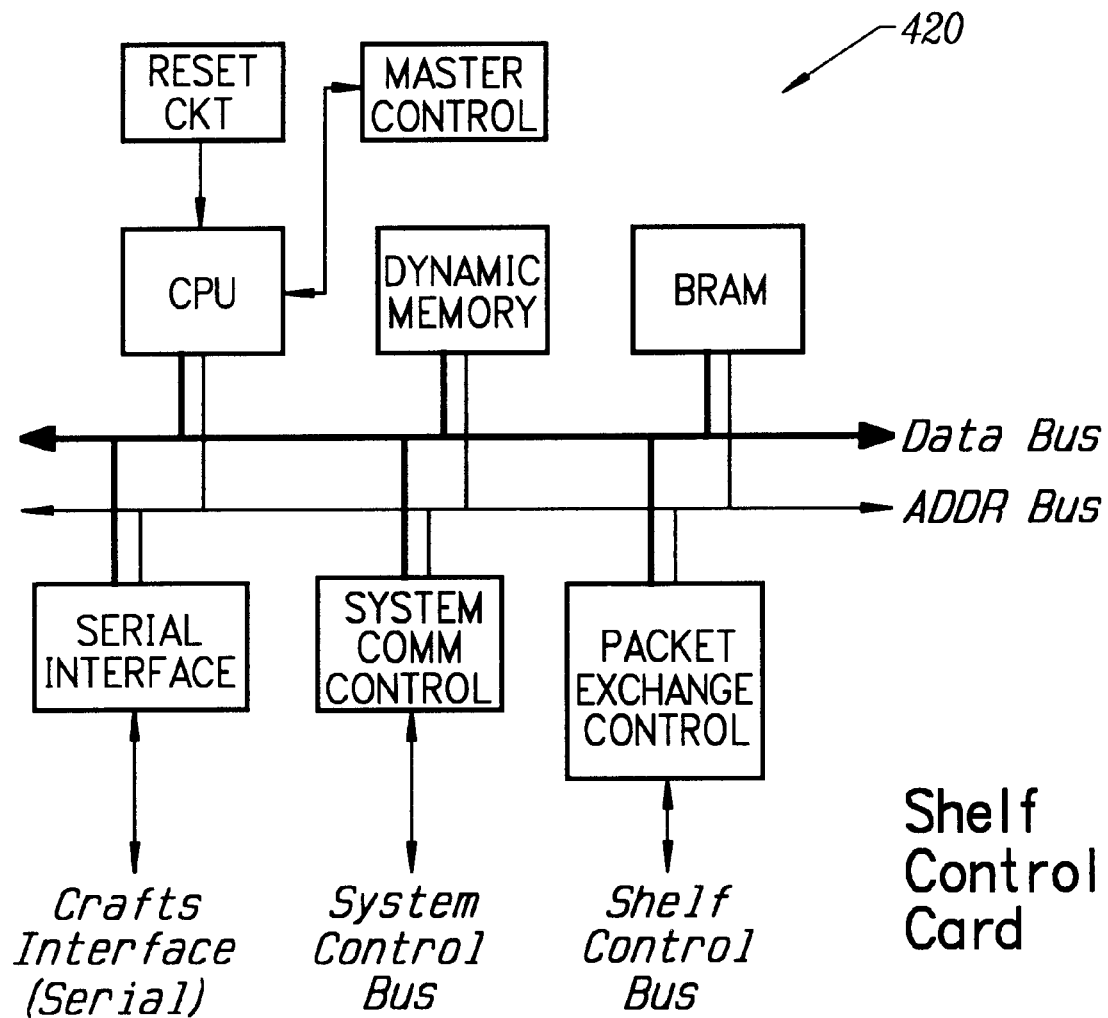

Referring to FIG. 4B, a shelf control card 420 is illustrated. The shelf control card controls configuration and management of the Fiber Interface Cards (FICs) and Performance Monitoring Cards (PMCs), which are described in more detail below. The shelf control card also communicates with the system controller for overall system control functions. The card is based upon a suitable processor such as an Intel-based processor designs, but can be others. Preferably, the cards support communication paths through the system. Each of these cards is installed in redundant or non-redundant configuration on a per shelf basis. 1+1 redundancy is the configuration of choice for the system.

In a specific embodiment, the control card 420 is composed of elements that support the general processing environment. The card has a processor 421, memory 424, 425, boot code and reset circuitry 422, and master control 423. Additionally, master control 423 determines which card is the active and standby controllers. The shelf controllers communicate through Compact PCI bus 428 to the FICs and the PMCs. The PCI bus is designed in a master/slave architecture to provide efficient communication. Each shelf card will be memory mapped to allow information to be exchanged between the system communication control (SCC) 427 and other cards installed on the shelf. The shelf card also has serial interface 426, which can be a local serial port.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like.

Fiber Interface Card

Figure 4C:
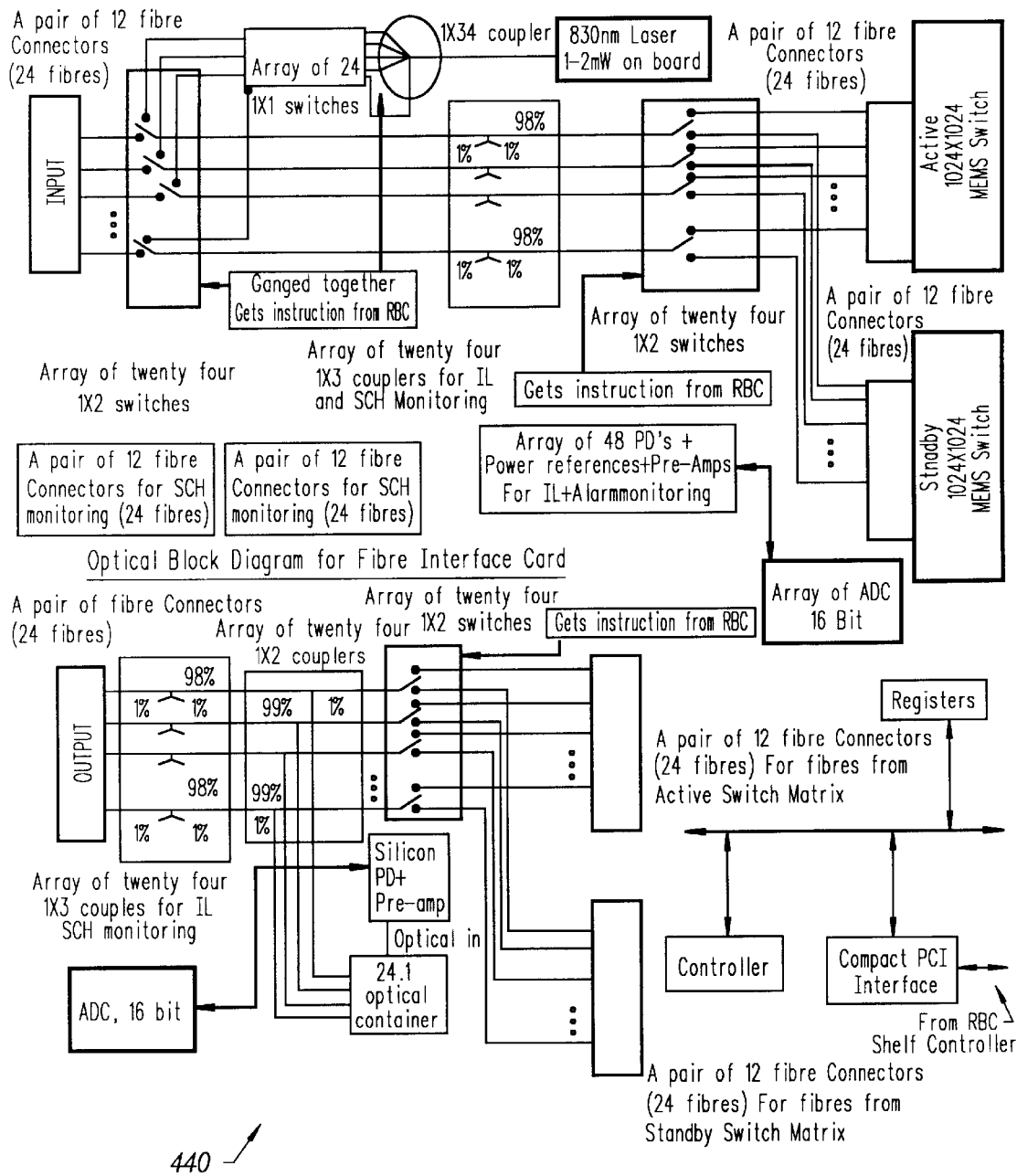

Referring to FIG. 4C, a fiber interface card 440 is illustrated. The fiber interface card terminates fibers. In a specific embodiment, forty-eight fibers can be terminated, although there may be more or less. The fibers can be divided equally between input and output. The input fibers are first sent to an array of twenty-four one by two (i.e., 1×2) switches. Each of such switches selects an input to the switch matrix between the incoming signal and a signal from a calibration source. The switch is synchronized with the signal coming from the calibration laser source, which prevents the calibration laser source signal and the incoming high speed optical signal from propagating on the same fiber. The FIC also has an electrical control for the one by two switches. Each of the switches has control, which is registered. The registers are visible to the control processor over a PCI type of back plane bus.

In a specific embodiment, the calibration laser source is an 830 nm laser with a mode harmonizing fiber, which harmonizes all the modes within the fiber. Such fiber is spliced with a 1×24 coupler. Each of the 24 outputs of the coupler transfers to a one by one (i.e., 1×1) on-off fiber-optic switch. Such one by one switch prevents one calibration beam spilling on to the other and cause cross-talk during calibration. The fiber carrying the signal then couples to a special coupler which splits the incoming signal into three parts with a predetermined ratio, e.g., 98:1:1. The two 1% legs transfer to an optical monitoring process and to the InGaAs photodiode +Amplifier array for "insertion loss" and "loss of signal" monitoring. The photodiode and amplifier convert the optical signal into an analog signal, which converts to digital using a digital to analog converter. The digital signal can be used with an alarm, which can also be a digital TTL type output from the InGaAs photodiode. The SOH optical monitoring is connected into a pair of 12 fiber connectors, where a signal is taken from the FIC to a separate card for Optical SOH monitoring.

The FIC also selects between an active and standby switch matrix. Here, the signal is derived from the FIC to a switch, which selects between an active and standby switch matrix. This switch is in an integrated package of 24 switches. The fiber coming out of the common switch port is taken to two separate pairs of 12 fiber connectors. While one pair is for the active switch matrix, the other is for the standby.

On the outgoing fiber side, fibers are received from the active and standby switch matrices and then input into an array of 24 two by one switches. The common fiber is then spliced with a 99:1 coupler. This coupler is arranged in an array of 24. The outputs go to a 24:1 combiner and then on to a silicon photodiode. The 99% split is then sent to a coupler, which splits the signal three ways (98:1:1). One of the 1% splits goes to the InGaAs PD, which monitors "Insertion Loss" and "Loss of Signal". The other 1% split goes to the pair of 12 fiber connectors and then on to the SOH monitoring card. The 98% split is sent to the outside world. This 2×1 will switch the optical transport between the backup switch matrix and the active switch matrix card. The card will have some electronics circuitry to drive the 2×1 switch and the fiber interface chips. Fiber redundancy is achieved by simply changing the cross connect configuration.

The fiber termination card taps individual fiber lines and extracts sample signals from each to monitor optical signal level and maybe other optical signal integrity signals. The sample signals or tap information is sent to the switch fabric. The back plane supports a limited number of fiber tap lines. The line card has special circuitry to select a smaller number of tap signals that will be placed into the back plane bus.

In a specific embodiment, the fiber path through the system can be diagnosable. Fiber termination card is a possible location to host the logic to insert and to detect test patterns. The insertion and detection mechanism on the fiber termination card together with the cross connect reconfiguration can help diagnose the entire optics path within the system. This fiber termination cards will work with the reference wavelength card to fully support performance monitoring requirements of the input optical signals. As shown, the FIC card has components to terminate the input fibers. The components include 1×2 Switches (input), taps for SOH & Power Level (e.g., input to 98%, 1%, 1% output), 1×2 switches (output), a Calibration Source at 830 nm, 1×1 switch (e.g., 0.4 db loss, 23 ms), a 1×24 coupler, a pair of 12 Fiber connectors for SOH monitoring, InGaAs (LW) PD's+ Amplifiers+Reference voltage source for in-line power monitoring, an electrical Mux as a possible interface before Analog to Digital Converters and others. The FIC also has components to terminate output fibers. Such components include a Silicon PD with Pre-Amplifier, 1 to 2 couplers 99% and 1%, 1 to 3 taps for SOH & Power level (IL), 1×2 standby switches to select incoming signal between active and standby, 24 to 1 coupler, a pair of 12 Fiber connectors for SOH monitoring, four InGaAs (LW) PD's+Amplifiers+ Reference voltage source for in-line power monitoring, an electrical Mux as a possible interface before Analog to Digital Converters, and others. Other elements include two connector pairs (1 for input and 1 for output) each connector has a plurality fibers. The other elements include connector pairs for Active and Standby Switches, and Connector pairs for fibers from Active and Standby switches. These and other elements are described in more detail below.

In a specific embodiment, the FIC has a fiber interface controller. That is, each shelf on the bay has it's own controller for the fibers coming in on it's shelf. The system controller switches each of the fibers on the shelf to main or the standby switching element. The FIC also has low cost+ low frequency a ray of 48 photo-detectors. These convert the 1% split-off from the incoming signal to electrical signals, amplify them if necessary, compare them against a known threshold and flag the LOL signal if appropriate. Also the card will digitize the voltage corresponding to the input optical power and pass it along over the data bus to the system controller. The system controller can extract the optical power info through the set algorithm from the digitized signal. The FIC also has on it a special optical module which takes an array of X fibers (X≦48) and using a two different taps converts an incoming light signal into three output signals of power levels: 98%, 1% and 1%.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Optical Switch Matrix

Figure 4D:
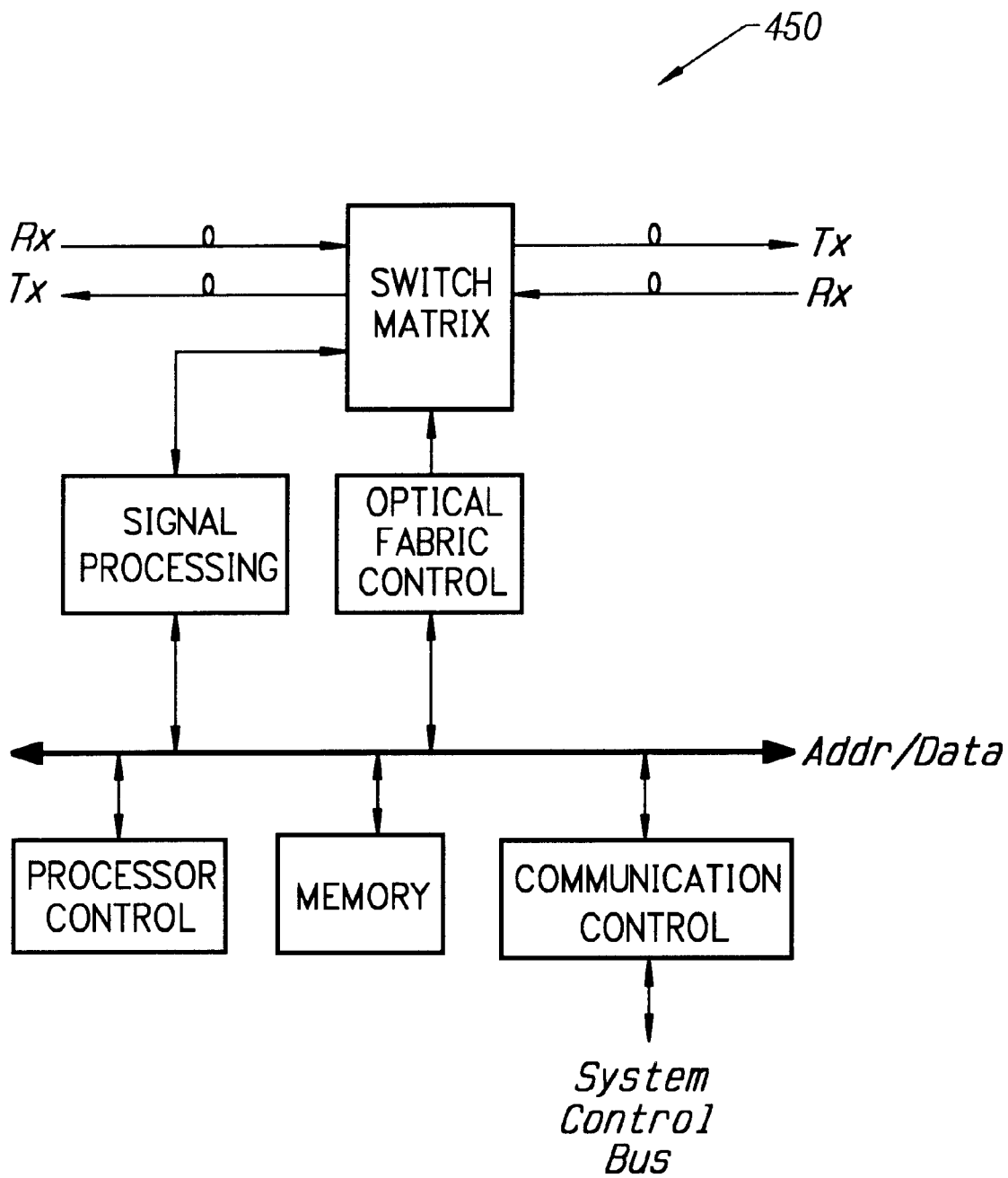

Referring to FIG. 4D, the system has an optical switch matrix that contains the switching fabric, digital control, analog control, and calibration circuitry to support the function of the switch. This module is a self-contained unit that is under the control of the REC to perform switching functions between optical input and output ports. The switch matrix digital control supports communication control from the REC, control of analog interfaces, calibration functions, and monitoring of the switch integrity. The electronic circuitry is visible to the control processor card, perhaps, through a PCI type of back plane bus. A redundant switch matrix slot is provided to support field replacement. Electrical lines in the back plane indicate to the fiber interface cards the current active fabric card. Switchover is coordinated responsibility with the fiber interface cards. Switch matrix diagnostics support isolating failures in the switching cells in a destructive manner. Self-test modes allow the entire switch fabric to be substantially free from defects. This may require external equipment to fully test data paths.

In a specific embodiment, the switch includes a switch fabric control to operate, monitor, and control each of the mirrors. The control uses analog control signals to control each of the mirrors. In a specific embodiment, the matrix includes 513 mirrors in each 256×256 switch. Each mirror has at least 2 axis controls, which relate to 1024 control signals. Some of the mirrors may share a single analog control line or bus, which may be bi-directional so it can be written to and read from. Such bi-directional bus allows for a determination of mirror position. Each of the control signals is addressed and selectable. Each mirror has a read/write (R/W) select for the analog control signal. Other features include digital to analog (DA) and analog to digital (AD) converters. An auto-sense and auto-correct feedback control circuitry corrects for any wobble of oscillation in the mirrors. Switch matrix diagnostics support isolating failures in the switching cells in a destructive manner. These and other features are included in the mirror matrix design.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Packet Extraction Card

Figure 4E:
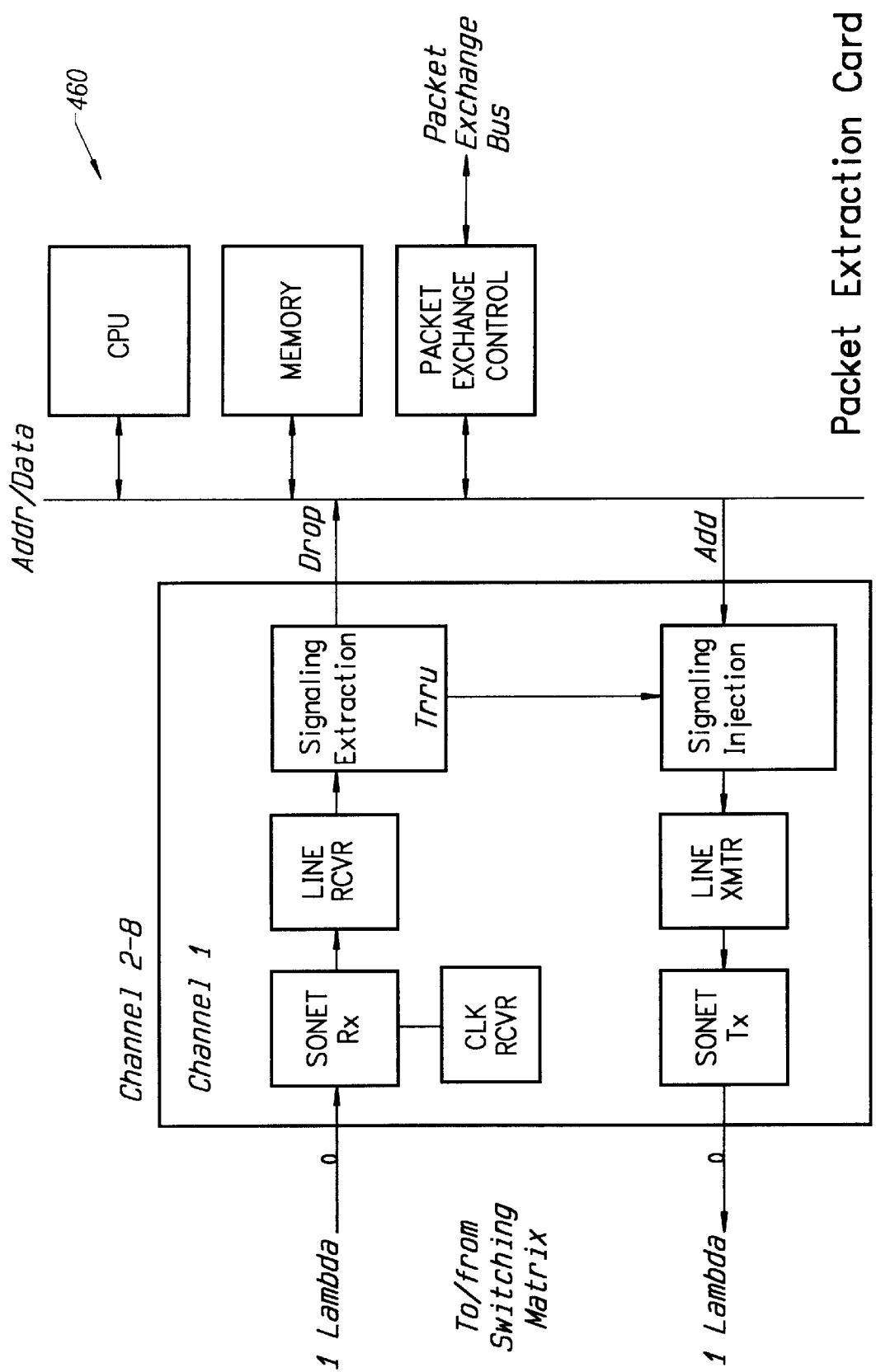

Referring to FIG. 4E, a packet extraction card 460 is illustrated. In a specific embodiment, optical signals from a selected number of fiber interfaces may be carried to the Packet Extraction Card (PEC). The Packet Extraction Card terminates signals directly from the switch matrix. The Packet Extraction Card extracts the SONET DCC channel from the optical stream. This card supports OC-192 and OC-48 and others. Support for higher speed interfaces such as OC-768 is also included. The extracted DCC payload is diverted to the Routing Engine Card as IP packets over the Packet Exchange. It is assumed that the wavelengths are carrying POS payload on the control streams. A signal extraction card may have more intelligence than the fiber interface cards and can have a small capacity general purpose CPU. A role of such a CPU may be to perform packet extractions and injection and to avoid terminating multiple SONET streams at the control processor. The main circuitry of the PEC supports the termination of the SONET signals, clock recovery, and extraction of the DCC channel. A control processor builds messages to and from the Routing Engine Card.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Performance Monitoring Card

Figure 4F:
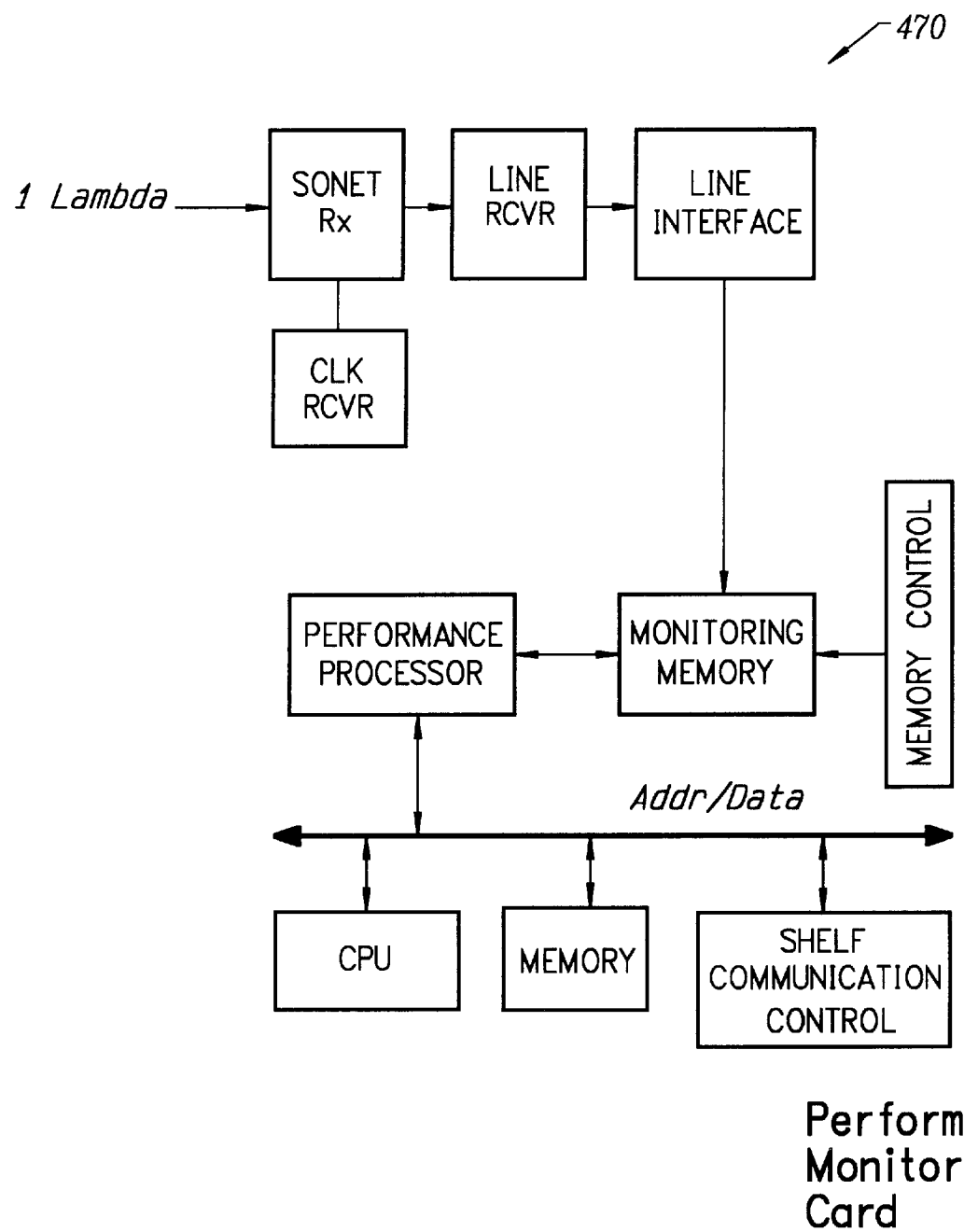

Referring to FIG. 4F, a performance monitoring card 470 is illustrated. In a specific embodiment, performance monitoring of the optical signals is accomplished though using distributed and centralized circuitry. Each of the fiber termination cards supports checking signal levels through an optical line module. Centralized testing is supported on the tapped signals from the fiber interface cards. This is a central resource card that support dynamic checking of all 4096 fibers. An array of detectors for monitoring purposes from the Optical IC for termination/ DC optical power measurement purposes are included.

In a specific embodiment, methods according to an embodiment of the present invention may be outlined as follows.

a) Estimated BER. The PMC measures bit error rate (BER) on an on-going shared basis. The PMC is coupled with the optical signal to noise ratio (OSNR)

and power measurement at the ingress and egress of the optical signal from the switch.

b) Optical SNR. The PMC measures signal to noise ratio (SNR) data on the system on an on-going shared basis using selected circuits, which are commercially available. As merely an example, equipment manufacturers like Tektronix or Agilent manufacture such circuits. Q-factor for the laser can be extracted from this data.

c) Electrical SNR. The PMC measures electrical SNR on the signaling channel. Preferably, it is only for the signaling channel.

d) Chromatic Dispersion. Chromatic dispersion will be measured. It is not required to measure this on an on-going basis but can be measured on an on-going basis.

e) Polarization Mode Dispersion. Polarization Mode dispersion will be measured. It is not required to measure this on an on-going basis but can be measured on an on-going basis.

f) Wavelength registration. The present system should not be wavelength sensitive in preferred embodiments and there for wavelength registration may not be measured.

g) Wavelength Drift. The present system should not be wavelength sensitive. Accordingly, drift will not be monitored in some embodiments.

h) Cross-talk. The present system will measure switch cross-talk. Wavelength cross-talk may or may not be measured. Switch cross-talk is measured by comparing input vs output OSNR+optical power level comparison.

i) Optical Power transients. Optical power transients will be monitored. Such transients occur due to laser operation. Fluctuation in power, if any, at the output ports will be monitored. Such fluctuations can be due to a variety of reasons, such as, but not limited to wobbling of the mirrors. Such power fluctuations will be compared against the input power.

j) Insertion loss. This will be measured on a constant basis.

k) Jitter. Jitter will be measured during troubleshooting of the system using an oscilloscope coupled to the system.

l) Optical Power Level. This is measured on a constant basis or variable basis.

m) Bit Rate: This is measured for control channel only, but can also be measured at other points.

In a specific embodiment, the monitoring card also couples to a variety of external measurement tools. Such tools monitor functions such as BER using external equipment, CRC payload, and CRC header, and the like. The card will support short and long-term integrations of test cycles. This allows thresholds to be set for long-term-integration of alarm conditions that require automatic or manual intervention. All alarms and counters will be available to the element manager. The Performance monitoring card is configured and monitored via the Shelf Control Bus.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Alarm Clock Card

Figure 4G:
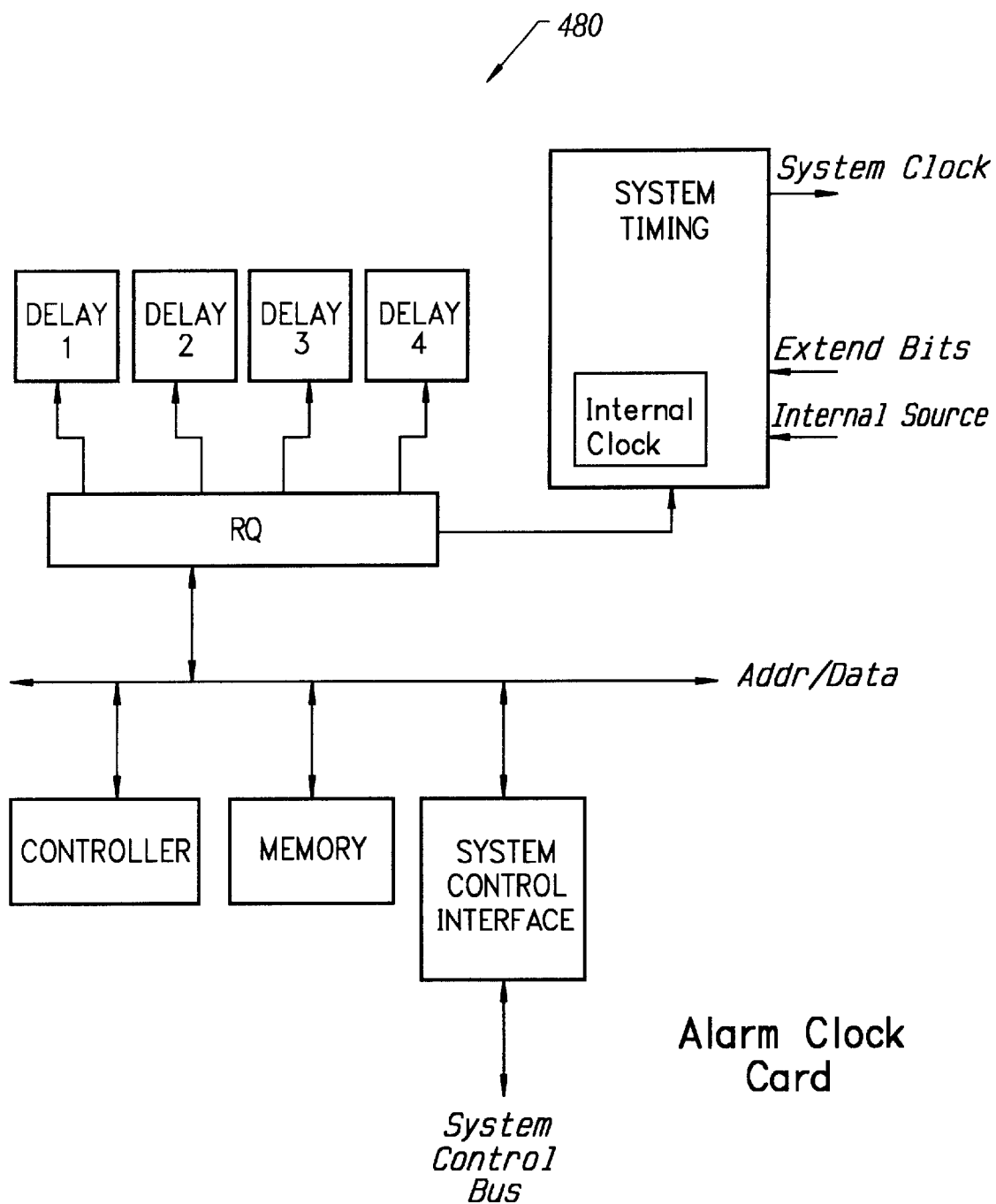

Referring to FIG. 4G, an alarm control card 480 is illustrated. The card includes various circuitry used to communicate to the central office the standard alarm indicators and provide system timing. The card is primarily composed of switches, relays, and PLL clocking circuit. The card conforms to Bellcore standards, as desirable. This card contains a general controller that will process commands that indicate whether to set or release relays indicating alarm conditions and clearing of alarm conditions. The system timing requirements will be based on extracting clocking from external inputs, or BITs clock, or internal timing sources. Internal sources will be through from terminated SONET signals. The timing circuitry will phase-lock to the input provided for synchronously running the system to a Stratum 3 clock source.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Power System and Control

Figure 4H:
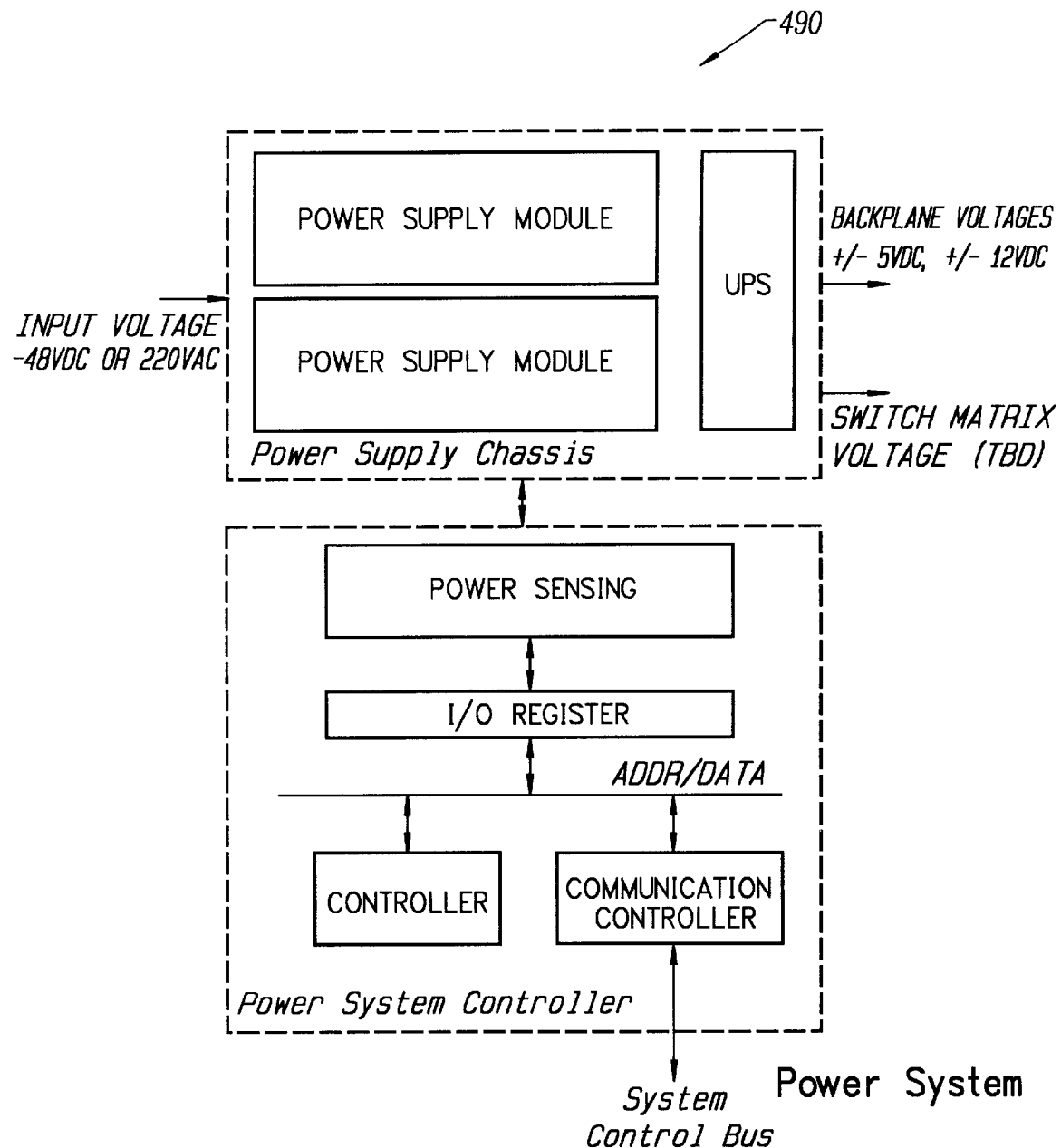

Referring to FIG. 4H, a power system 490 is illustrated. The power system for the switch system is a redundant design to insure high-availability. The power systems are designed for −48VDC and 220VAC input voltages. Components of the power system include a (1) power supply controller, (2) power supply modules, and (3) the power chassis. One power system is used per bay but can also include more than one power supply. Power consumption at each node should not exceed 1000 W maximum. Power control and redundancy are managed on a per bay basis. Control circuitry support communication paths to the system controller (REC), load sharing, input voltage monitoring, and failure reporting. The communication path to the system controller is done through the system control bus. The cards will contain sensing circuitry for the input power to detect brown-out conditions. The power system provides +5VDC, +5VDC, +12VDC, +12VDC to the electrical backplane. Special voltage inputs to support the switch matrix may be required. The power system for the switch matrix card may also include an uninterrupted power supply (UPS) to keep power applied to the switch matrix system to support power failure conditions.

The present system also includes an electrical backplane. The back plane supports the power to the cards, system control bus, shelf control buses, and the packet exchange bus. A desire is to have shelf busses be designed the same for the fiber interface shelves. These buses will also provide grounded pins for card slot recognition to support addressing each card. There will be at least two different backplanes to support the fiber interface shelves and the controller shelf. The shelf control bus and the packet exchange bus will be based on the compact PCI architecture. This architecture supports hot swap capability, which may be required for the system. The backplanes support redundant buses to reduce single points of failure.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 5:
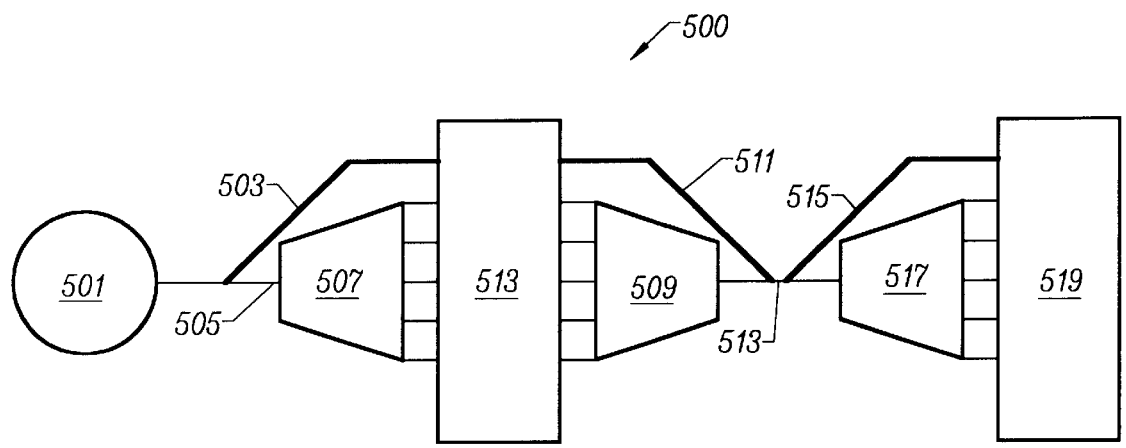
FIGS. 5 and 6 are simplified diagrams of systems having in-band connectivity according to embodiments of the present invention
Figure 6:
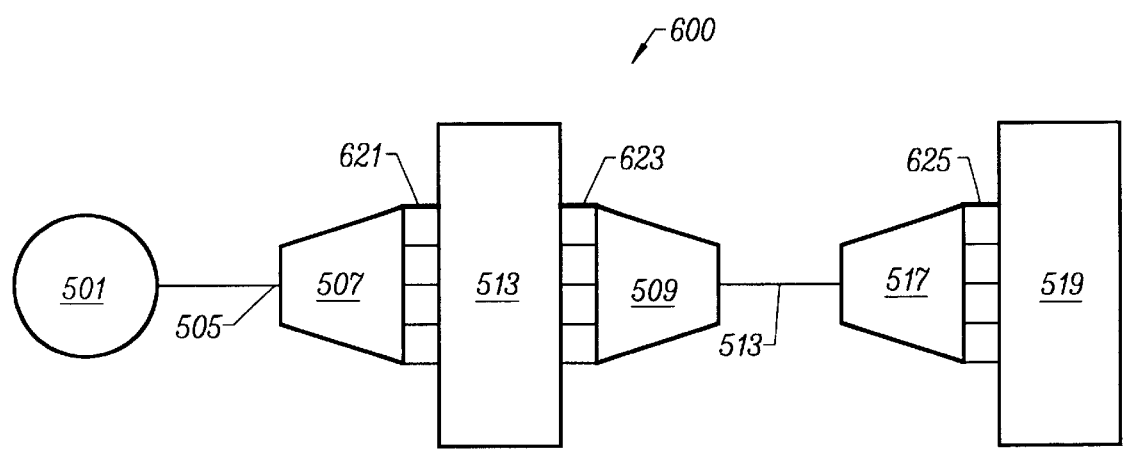

FIGS. 5 and 6 are simplified diagrams of systems 500, 600 having in-band connectivity according to embodiments of the present invention. These diagrams are merely examples and should not unduly limit the scope of the claims herein. One of ordinary skill in the art would recognize many other variations, modifications, and alternatives. The term in-band connectivity is often described as a physical connection over fiber between at least two switches or a switch and a client router or other connection. The physical connection often hosts the in-band signaling channel. A purpose of hosting the control signaling channel in-fiber is to perform at least the following:

run control protocol:
fiber cut detection:
link integrity: and
link management (LMP).

As shown, the simplified diagram provides a high level description of in-band connectivity between two systems. In-band connectivity of switches or switch and client router is achieved over serial link hosted on PEC card, which are made available to REC card. Software module(s) on REC card enables IP services on this serial link using Point-to-Point (PPP) protocol. REC card software maintains one instance of PPP session for each serial link between two adjacent switches (or a client router at the edge). Once IP service is enabled on a serial link it will be available for all IP related applications such as, IP routing, IP forwarding, OSPF etc. Related configuration information is stored on disk on REC card and are made redundant. Software components often required to support in-band connectivity functionality resides on either on REC card or PEC card. Following are high level components per card type, REC card
  PPP module
  IFM/PPP—command front-end module for configuration of SONET driver on PEC card
  Messenger (host), IOP manager (runs on host only)
  CPCI driver on REC
PEC card (line terminating and DCC steal versions)
  SONET driver (payload vs. DCC steal versions)
  IFM/PPP—command backend module for configuration of SONET driver
  Messenger Referring to FIG. 5, control information is derived from the REC, where the information is packetized. The information is transferred to the PEC card through an interface such as PCI. The PEC card receives the control information. Such information is received as packets. The packets are converted into framed carrier signal such as OC3, OC12, OC48, OC192, and others, and transferred through a fiber interface card (FIC), which interfaces to a fiber. Such framed carrier signal is transferred outside of the co-located multiplexer and is transferred via the optical supervisory wavelength channel, i.e., OSC. As the signal traverses through the fiber, the framed carrier signal is extracted from the OSC, converted through the PEC card, and then transferred to the REC card, where the information is processed.

Referring to FIG. 6, control information is derived from the REC, where the information is packetized. The information is transferred to the PEC through an interface such as PCI. The PEC card receives the control information. Such information is received as packet. The packets are converted into framed carrier signal such as OC3, OC12, OC48, OC192, and others, and such signals are transferred through the fiber interface card, i.e., FIC. Such framed carrier signal is transferred to multiplexer through common fiber, where one of the wavelengths can represent the control information. As the signal traverses through the fiber, the framed carrier signal is extracted from the multiplexer device, which is transferred to the FIC card, which transfers the framed signal to the PEC card, and then transferred to the REC card, where the information is processed.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

The system is merely provided to show an example of a way of implementing the present invention. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical communication system for switching one of a plurality of optical signals through a MEMS based cross-connect device, the system comprising:
    first fiber input/output device;
    second fiber input/output device;
    an optical cross-connect device coupled between the first fiber input/output device and the second fiber input/output device; and
    an in-band communication control device coupled to the optical cross-connect device, the in-band communication control device being adapted to identify a wavelength from either one of the first input/output device or the second fiber input/output device and being adapted to select one of the first input/output devices for transmitting internal information to a second optical switch system through an optical fiber pathway between the configured between the optical cross-connect device and the second optical switch system.

2. The system of claim 1 wherein the internal information includes a wavelength and a data rate associated with the wavelength.

3. The system of claim 1 wherein the internal information is control information.

4. The system of claim 1 wherein the communication control device is adapted to open a path from the selected fiber input/output device to the second optical switch system.

5. The system of claim 1 wherein the first fiber input/output device comprises a multiplexer device.

6. The system of claim 1 wherein the second fiber input/output device comprises a multiplexer device.

7. The system of claim 1 further comprising a packet extraction card coupled to a fiber interface card, the fiber interface card couples to the first input/output device.

8. The system of claim 1 further comprising route engine control card coupled to a packet extraction card, the packet extraction card coupled to a fiber interface card, the fiber interface card couples to the first input/output device, the route engine control card, packet extraction card, fiber interface card being adapted to transfer the internal information.

9. The system of claim 1 wherein the internal information is transferred through the optical fiber pathway in a frame carrier.

10. The system of claim 1 wherein the internal information is transferred as OC3, OC12, OC48, or OC192.

11. A method for communicating between at least two optical switching systems, each of the optical switching systems including an optical cross-connect coupled to an incoming fiber bundle and coupled to an outgoing fiber bundle, the method comprising:

determining a control channel from a plurality of available channels, the plurality of available channels being on a plurality of optical fibers, the plurality of optical fibers being coupled between a first optical switch system and a second optical switch system;

opening an internal communication loop for the control channel between a first multiplexing device coupled to the first optical switch system and a second multiplexing device coupled to the second optical switch system;

forming a connection between the first optical switch system and the second optical switch system during a period of time that the internal communication loop has been opened; and maintaining the connection and transferring internal information between the first optical switch system and the second optical switch system.

12. The method of claim 11 wherein the opening of the internal communication loop is provided by changing a first configuration on the first multiplexing device and changing a second configuration on the second multiplexing device.

13. The method of claim 11 wherein the internal information is processed at the first switch system.

14. The method of claim 11 wherein the internal communication loop is an optical supervisory channel (OSC).

15. The method of claim 11 wherein the internal information includes control messages.

16. The method of claim 11 wherein the internal information comprises information for constructing an IP network.

* * * * *